Oct. 19, 1937.   H. S. KOZŁOWSKI   2,096,111
ELECTRIC MOTOR OR MACHINE
Filed June 8, 1936   2 Sheets-Sheet 1
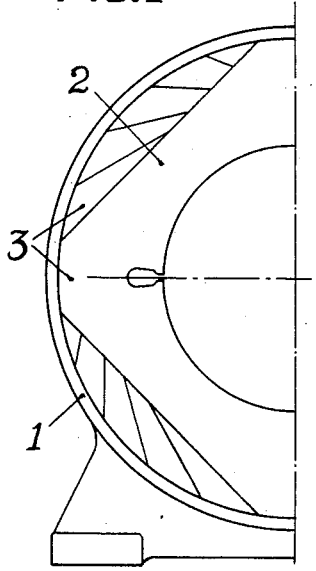
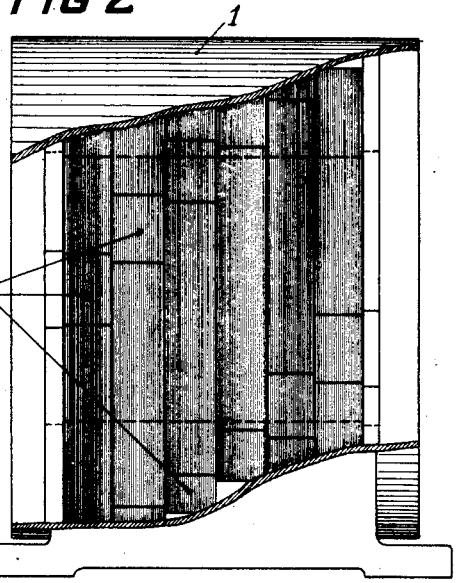
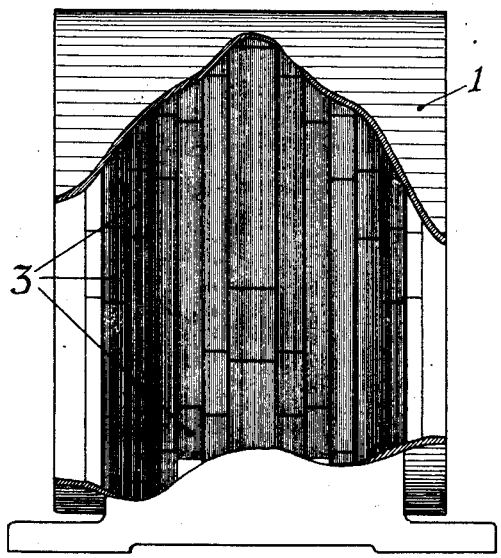
Inventor
H. S. KOZŁOWSKI
By C. F. Wenderoth
Attorney Oct. 19, 1937.   H. S. KOZŁOWSKI   2,096,111
ELECTRIC MOTOR OR MACHINE
Filed June 8, 1936   2 Sheets-Sheet 2
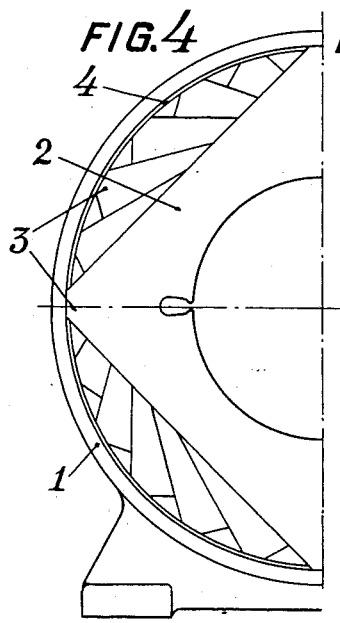
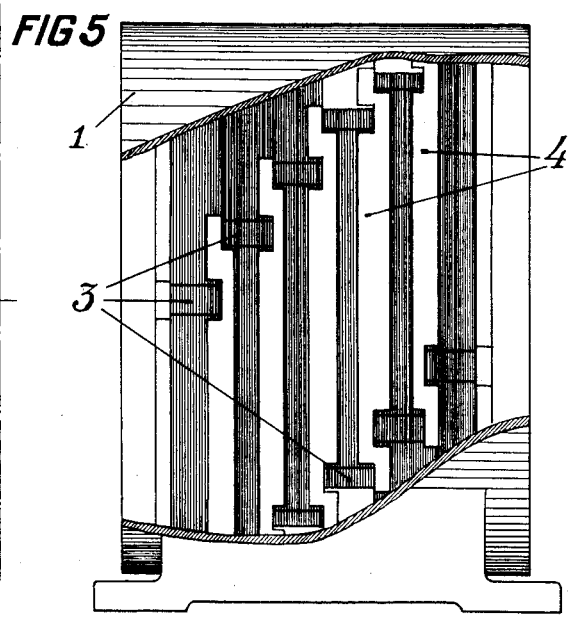
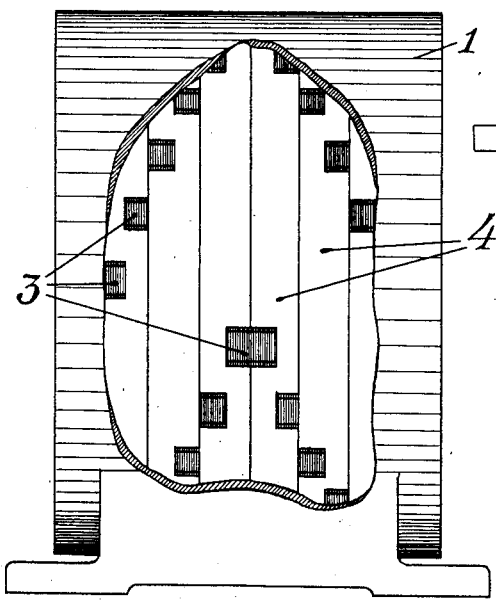
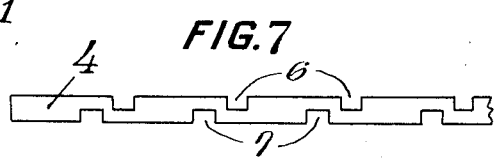
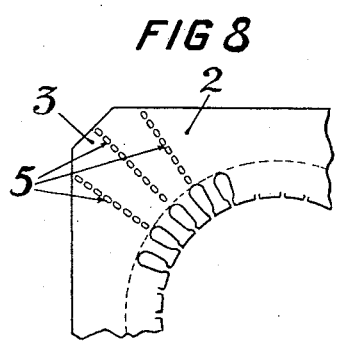
Inventor
H. S. KOZŁOWSKI
By C. F. Wenderoth
Attorney Patented Oct. 19, 1937

2,096,111

UNITED STATES PATENT OFFICE 2,096,111

ELECTRIC MOTOR OR MACHINE

Henryk Stanisław Kozłowski, Warsaw, Poland

Application June 8, 1936, Serial No. 84,211
In Poland June 15, 1935

7 Claims. (Cl. 171—252)

My invention relates to electric dynamos, by which of course I mean either motors or generators, and in particular is an improvement over those in which it has been already proposed to stagger rectangular stator sheets angularly at 45° with respect to each other. Machines constructed according to that prior art proposal possess the dual disadvantage that there is no sufficient clamping of the plates, and that there is little rigidity of support from the stator at the points where the stator sheets contact therewith.

It has also been proposed to provide, in the middle of the sides of the stator sheets, arc-shaped concave niches, there being radiation ribs extending inwardly from the stator frame, and tending to fix the plates in position. Many disadvantages attend this construction, for the motor is noisy, since the laminae or sheets are not compressed; ribs must be provided and made of greater depth than is customary, since in order to provide for adequate ventilation inasmuch as the ventilation is cut off at the corners of the laminae, the stator frame must be of larger diameter than usual, thus necessitating the use of more material; there is the very serious expense attendant upon the complicated punching.

My present invention, which solves the foregoing difficulties, permits saving in the material from which the stator is constructed, improves the cooling of the stator, due to the screw channels formed between the bundles of the sheets and the motor casing, and renders the magnetic reluctance from one radial section of a sheet to another approximately uniform, employs sheets of polygonal contour, i. e. triangular, rectangular, or other non-circular outer periphery, which sheets have obtuse corners, preferably truncated, and which are shaped to fit in the stator frame. These sheets are gathered in bundles, the several bundles being staggered with respect to each other in either a screw or zig-zag path, in a manner to be more fully described hereinafter. An electric machine constructed according to my invention possesses greater rigidity of the bundles of sheets than do the prior art machines mentioned in the beginning of this specification. Furthermore, electrical symmetry is obtained without the necessity of cutting notches in the corners of the sheets, and finally, due to the forming of the said screw-like ventilation channels, improved cooling results.

To facilitate further description of the invention, reference is made to the accompanying drawings, representing the at present preferred embodiment of my invention, wherein:

Fig. 1 is an elevation of a stator provided with polygonal sheets according to my invention;

Fig. 2 is a side view of the machine according to my invention, a part of the machine casing being cut away, showing in elevation the bundles of sheets staggered with respect to each other along a screw path.

Fig. 3 illustrates a side view of a variation of the machine according to my invention, a part of the machine casing being cut away, to show in elevation the bundles of the sheets staggered with respect to each other along a zig-zag path.

Fig. 4 is an elevation of a stator formed of bundles of polygonal sheets, the corners of which are gripped by the clamping strips.

Fig. 5 is a side elevation of the machine according to Fig. 4, part of the stator casing being cut away.

Fig. 6 is a front elevation of the machine according to Figs. 4 and 5, the bundles of sheets being elevated to form a zig-zag path, whereas the corners of the bundles are gripped by means of clamping sheets.

Fig. 7 is a showing, on a greatly reduced scale, of a developed holding stake or strip such as is also shown in Figs. 5 and 6; while Fig. 8 is a fragmentary detail elevation of a single stator sheet.

Turning now more specifically to Figs. 1 and 2, it will be seen that bundles 2 of polygonal sheets are mounted in the stator frame 1, which is shown as being unobstructed along its inner periphery. Tapered or truncated corners 3 are provided on the sheets 2, adapted in contour to the said inner periphery of the stator frame 1, so that they bear against the inner periphery over a considerable area. Thus, in the case shown, there are four bearing surfaces for each bundle.

The several bundles are each staggered a small angular distance with respect to each other, and when the staggering is in the same direction, the corners of the bundle lie along somewhat the development of a screw line. If desired, however, a certain number of bundles may be staggered in a clockwise direction, say, and subsequent bundles staggered in a counter-clockwise direction, so that the corners of the bundles lie along somewhat the development of a zig-zag line.

To prevent the sheets constituting a bundle from separating, thus giving rise to undetermined increases in the magnetic reluctance, and to objectionable chattering when the machine is in operation, the corners of the bundles may be clamped or riveted. I prefer, however, to employ a novel form of holding stake or strip 4, shown in development in Fig. 7, preferably of strip-like form. As shown in Fig. 5, these strips are wound longitudinally around the inner periphery of the stator frame 1, and have a series of recesses 6 and 7 on each side thereof. The recesses or grooves on one side are off-set with respect to those on the other side; and the grooves are so dimensioned that when a groove 6, say, of one strip 4 cooperates with the corresponding groove 7 of the next adjacent strip 4, they will firmly clamp one corner of a bundle, in correct spatial relation to the other bundles.

Looking at the fragmentary portion of a single sheet as shown in Fig. 8, it will be seen that the sheet is made up of a plurality of radial elemental strips or sections of widely varying length, all of the same thickness of metal, and hence of varying magnetic reluctance. In order to render the magnetic reluctance at least approximately uniform, I cut out small radial rows of slits 5, in the wider elements; and when the number of slits is properly calculated, the result is that the magnetic losses in the iron are decreased.

My invention results in considerable saving in material over the circular laminae ordinarily used in stator construction, it being ensured that the mean effective width remains the same. Furthermore, no cooling ribs are required, despite the fact that exceptionally good cooling of the sheets is obtained. It is to be noted that my invention is suitable to any type of motor, for any type of service, whether it be for open or closed frame, varying or constant load.

Once the broad features of my invention are disclosed it will be seen that many merely colorable variations will readily occur to those skilled in the art. Accordingly, I intend to be limited only by the scope of the appended claims.

I claim:

1. An electric dynamo, comprising a stator frame, and a plurality of bundles of thin, stator sheets, each sheet being of plate-like form, each bundle being of polygonal shape, the corners of the sheets and hence of the bundles, being cut-off and shaped to fit the inner surface of the frame over a substantial bearing area, the said bundles being staggered with respect to each other so that their corners lie along the development of a screw path.

2. An electric dynamo, comprising a stator frame, and a plurality of bundles of thin, stator sheets, each sheet being of plate-like form, each bundle being of polygonal shape, the corners of the sheets and hence of the bundles, being cut-off and shaped to fit the inner surface of the frame over a substantial bearing area, several successive bundles being staggered in one direction and several succeeding bundles being staggered in the opposite direction, so that their corners lie along the development of a zig-zag screw path.

3. An electric dynamo, comprising a stator frame having a substantially free, continuous inner surface, a plurality of thin, stator sheets, each of plate-like form, of polygonal shape, the corners of which are cut-off and shaped to fit the inner surface of the frame over a substantial bearing area, the said sheets being grouped in a plurality of bundles, each of which bundles is staggered with respect to the adjacent bundles so that the corners of the bundles lie along the development of a screw path, and clamping strips extending longitudinally around the periphery of the stator frame, and having notches or recesses therein for engaging the laminae of each bundle adjacent the corners of the latter and serving to clampingly hold the bundles in position.

4. An electric dynamo, comprising a stator frame having a substantially free, continuous inner surface, a plurality of thin, stator sheets, each of plate-like form, of polygonal shape, the corners of which are cut-off and shaped to fit the inner surface of the frame over a substantial bearing area, the said sheets being grouped in a plurality of bundles, each of which bundles is staggered with respect to the adjacent bundles so that the corners of the bundles lie along the development of a screw path, and clamping strips extending longitudinally around the periphery of the stator frame, and having notches or recesses therein for engaging the laminae of each bundle adjacent the corners of the latter and serving to clampingly hold the bundles in position, the said strips being notched or recessed on opposite sides, in such manner that the strips serve to hold adjacent bundles, and the notches on adjacent faces of adjacent strips cooperate to clamp the bundle between them.

5. An electric dynamo, comprising a stator frame, and a plurality of bundles of thin, stator sheets, each sheet being of plate-like form, each bundle being of polygonal shape, the corners of the sheets and hence of the bundles, being cut-off and shaped to fit the inner surface of the frame over a substantial bearing area, several successive bundles being staggered in one direction and several succeeding bundles being staggered in the opposite direction, so that their corners lie along the development of a zig-zag screw path, and clamping strips extending longitudinally around the periphery of the stator frame, and having notches or recesses therein for engaging the laminae of each bundle adjacent the corners of the latter and serving to clampingly hold the corners of the bundles in position, so that each individual sheet closely presses against the adjacent sheets at the corners.

6. An electric dynamo, comprising a stator frame, and a plurality of bundles of thin stator sheets, each sheet of plate-like form, each bundle being of polygonal shape, the corners of the sheets and hence of the bundles, being cut off and shaped to fit the inner surface of the frame over a substantial bearing area, the said bundles being staggered with respect to each other so that their corners lie along the development of a screw path, each of said sheets having radial elemental sections of varying length and hence of varying magnetic reluctance, there being a plurality of holes cut along the longer of said elemental sections in order to render the magnetic reluctance more uniform from section to section.

7. As an element of an electric dynamo, a thin, stator sheet of plate-like form and of polygonal shape, the corners of which are cut off and shaped to fit the inner surface of a cooperating stator frame over a substantial bearing area, said sheet having radial elemental sections of varying length and hence of varying magnetic reluctance, there being a plurality of holes cut along the longer of said elemental sections in order to render the magnetic reluctance more uniform from section to section.

HENRYK STANISLAW KOZLOWSKI.